United States Patent [19]

Crowell et al.

[11] E Re. 30,123

[45] Reissued Oct. 23, 1979

[54] APPARATUS FOR CONTROLLING ADDITION OF REPLENISHMENT SOLUTION TO A PHOTOGRAPHIC PROCESSOR

[75] Inventors: John A. Crowell; Alan D. Bull, both of Wilmington, Del.

[73] Assignee: E. I. Du Pont de Nemours and Company, Wilmington, Del.

[21] Appl. No.: 702,447

[22] Filed: Jul. 6, 1976

Related U.S. Patent Documents

Reissue of:

[64] Patent No.: 3,822,723
Issued: Jul. 9, 1974
Appl. No.: 358,860
Filed: May 10, 1973

U.S. Applications:

[63] Continuation-in-part of Ser. No. 287,664, Sep. 11, 1972, abandoned.

[51] Int. Cl.[2] ..... G05D 3/00

[52] U.S. Cl. ..... 137/624.15; 354/297; 222/70

[58] Field of Search ..... 137/624.11, 624.15, 137/3, 487.5; 222/70; 354/297, 298, 324, 331

[56] References Cited

U.S. PATENT DOCUMENTS

| | | | |
|---|---|---|---|
| 3,334,566 | 8/1967 | Friedel | 354/297 |
| 3,529,529 | 9/1970 | Schumacher | 354/297 |
| 3,561,344 | 2/1971 | Frutiger et al. | 354/298 |

FOREIGN PATENT DOCUMENTS 2004893 8/1971 Fed. Rep. of Germany .

*Primary Examiner*—Alan Cohan

[57] ABSTRACT

An apparatus for controlling make-up and addition of replenishment solution to a photographic processor, having one or more reservoirs and metering pumps for selecting make-up solution concentrates, and electronic controls for determining the volume of replenishment solution. Replenishment can be accomplished taking into consideration all of the operating variables such as film size, replenishment rate, and percent exposure, as well as the cumulative effect of any additions and aerial oxidation of the solution while not in use.

16 Claims, 4 Drawing Figures

APPARATUS FOR CONTROLLING ADDITION OF REPLENISHMENT SOLUTION TO A PHOTOGRAPHIC PROCESSOR

Matter enclosed in heavy brackets [ ] appears in the original patent but forms no part of this reissue specification; matter printed in italics indicates the additions made by reissue.

CROSS REFERENCE TO RELATED APPLICATIONS

The present application is a continuation-in-part of U.S. Pat. application Ser. No. 287,664, now abandoned, which was filed on Sept. 11, 1972 by the same inventors.

BACKGROUND OF THE INVENTION

1. Field of the Invention

This invention relates to photographic processing apparatus and particularly to apparatus for controlling the composition and addition rate of replenishment solutions used in photographic processing apparatus.

2. Description of the Prior Art

It is well known in the art of developing silver halide photographic films in automatic processing apparatus the developer solutions are subject to change due to accumulation of development products and aerial oxidation. To obtain reproducible, automatic processing, a replenisher solution is normally added to compensate for the changed activity of the developer solution due to prior use or aging. Such addition can be accomplished manually by the operator based on visual observations of processed sample strips. On the other hand automatic equipment can be used to either chemically analyze the processing solutions or read the density of processed strips and feed back the data to metering means to replenish the solutions.

When the addition of replenishing solution is done manually, even with the aid of charts to assist the operator in determining the appropriate amounts to be added, the system is subject to operator error. As the number of variables that must be taken into consideration increase, the estimation of the amount and rate of replenishment becomes exceedingly complex. A number of semi-automatic processors are available allowing a limited, preselected choice of replenisher addition based on the film size, degree of exposure and type of film used. However, such corrections do not compensate for oxidation of the processing solution due to aging. Such oxidation is dependent upon the history of the processing solution in the processor, and correct compensation can only be achieved by accounting for every piece of processed material that has gone through the equipment, the corresponding replenisher addition, the rate of oxidation in the tank, and the time that has elapsed since the last addition.

When the addition of replenishment is controlled by automatically sampling the processing solutions, such problems are minimized but the complexity and cost of equipment greatly increase, while reliability suffers.

Schumacher, U.S. Pat. No. 3,529,529 discloses a method and apparatus for the addition of replenishment solution to compensate for changed activity by sampling and titrating developer bath.

Freidel, U.S. Pat. No. 3,334,566, discloses a photographic developing apparatus using sensing means and a variable impulse control for maintaining the concentration of developer solution by addition of processing chemical solutions.

Frutiger, U.S. Pat. No. 3,561,344 discloses an apparatus for processing photographic film in which replenisher, developer and fixer solutions are supplied on demand. The continuously moving, fixed photographic film is light monitored to provide a plurality of modulated signals which are a function of the degree of transparency presented by the photographic film being processed.

SUMMARY OF THE INVENTION

It is an object of this invention to provide economical and accurate replenishment of solution in an automatic film processor. It is a further object of the invention to provide a high degree of repeatability in controlling addition of replenishment solution on the basis of demand in terms of several, preferably three, operating variables, e.g., film size, replenishment rate and percent exposure. It is a still further object of the invention to provide a method to compensate for the aging of the processing solutions by automatically adding an appropriate amount of replenishment solution based on the use of the equipment during a given time interval and the pre-established degradation of the processing solution. The apparatus of this invention is therefore useful in that it achieves, in a simple manner, excellent processing solution consistency independently of the rate of usage of the equipment.

In its broadest concept, the invention comprises an apparatus designed to automatically replenish the various constituents of a solution used in a photographic processor. It is designed to automatically replenish those constituents as they are utilized each time film is processed by the film processor, and it is also designed to replenish the solutions, on a periodic basis, to account for non-use deterioration of the solution. The two replenishment steps are tied to one another so that the amount of non-use replenishment is reduced by the amount of film use replenishment.

Specifically, the invention comprises an apparatus for controlling the addition replenishment solutions to a photographic processor comprising:

1. at least one reservoir for solution concentrates,
2. at least one metering means associated with said reservoir for transferring a portion of said solution concentrate from said reservoir to said processor, and
3. means for controlling said metering means comprising:
   a. a first variable signal generator including: means to generate a first variable electrical signal; at least one means to independently vary such first electrical signal; means to apply said first electrical signal to control said metering means, and means to cumulatively store such first electrical signal, thereby forming an accumulated first electrical signal;
   b. a second signal generator to periodically generate a second, preset, electrical signal;
   c. means to compare said second electrical signal with the accumulated first electrical signal and
   d. means to apply the output of said means to compare said second and accumulated first electrical signals to control said metering means.

In the preferred embodiment, the output of said means to compare is the difference between said second and said accumulated first electrical signals.

The means to generate and independently vary the first electrical signal may comprise a pre-set counter for activating said metering means, said pre-set counter having means for selecting the set number of received pulses during which it will activate said metering means, and a time base generator, which may be a ramp generator, connected to said pre-set counter, for generating a periodic signal, said time base generator having means for varying the period of the signal it generates.

Such means will accommodate two independent variables. In the preferred embodiment, the apparatus further comprises a linear time base modulator connected between said pre-set counter and said time base generator, for modulating the period of the signal generated by said time base generator and generating a signal with a period equivalent to that of the modulated signal. The time base modulator has means to vary the modulation applied to the signal generated by the time base generator. Such an apparatus can accommodate three independent variables.

The control means comprising the time base ramp generator, linear time base moduator, and electronic counter provides control of the addition of replenishment solution in terms of film size, replenishment rate, and percent exposure, respectively. By providing independent control of the addition of replenishment solution in terms of these operating variables simplicity and flexibility in operation is accomplished. The use of digital electronic counting techniques provides accurate and repeatable addition of replenishment solution over a wide range of the operating variables, not obtainable with conventional electronic or electromechanical timers.

The means to generate the second variable electrical signal, the accumulator of the first electrical signal, and the means to subtract said first accumulated electrical signal from said second variable electrical signal, will be referred to from here on as the equalizer network. Such equalizer network may comprise a first three circuit cam timer operating as a time base repeater in combination with a second two circuit summation timer having a clutched reset mechanism. Such an arrangement can accumulate and store an electrical signal as elapsed operating time and generate a signal whose duration will be a pre-set time interval reduced by the elapsed operating time.

The apparatus of the invention further provides for make-up and addition of replenishment solution from one or more constituent concentrates, e.g., concentrates may be supplied in varying concentrations from any number of reservoirs.

DESCRIPTION OF THE PREFERRED EMBODIMENT

Figure 1:
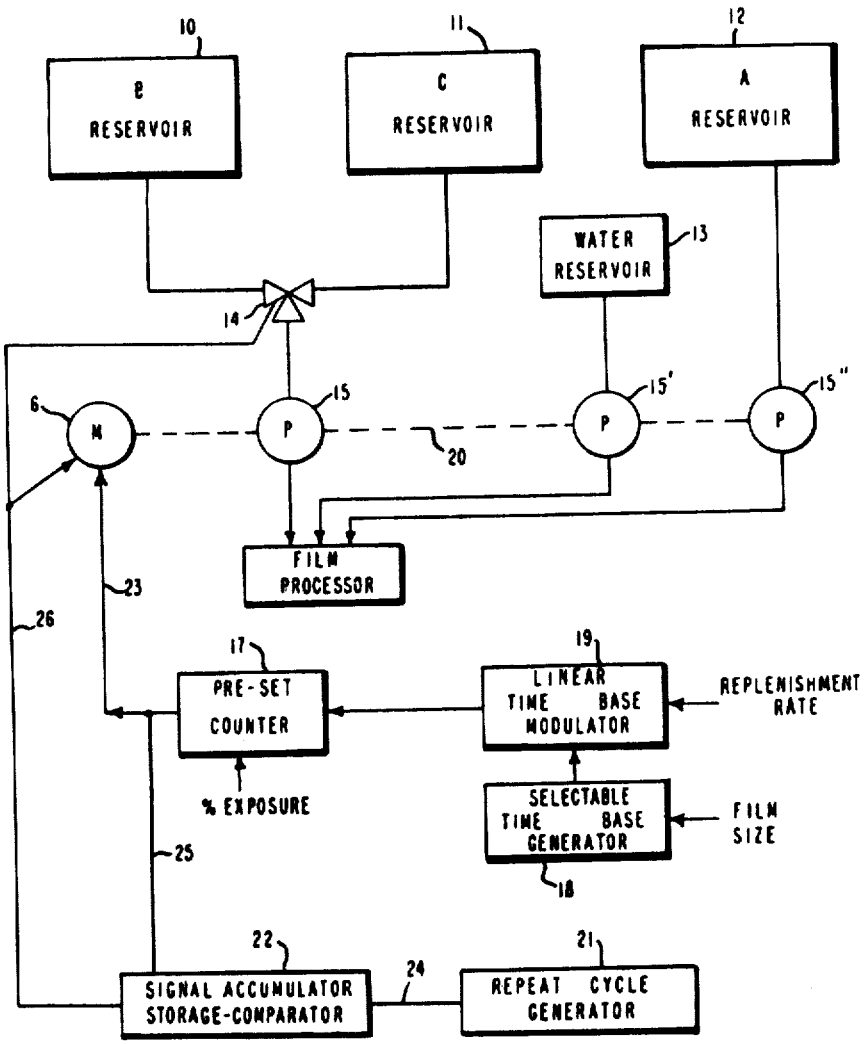
FIG. 1 is a block diagram of the apparatus embodying the invention.

With particular reference to FIG. 1, an apparatus embodying the invention may comprise a plurality of reservoirs 10, 11, 12 and 13, one or more of which provide concentrates for make-up of replenishment solutions. One or more of the solutions may be made available in varying concentrations, e.g., reservoirs 10 and 11, and selection of concentrates for make-up of the desired concentration of replenishment solution provided by means of a three-way valve 14. A water reservoir 13 is provided for maintaining the desired dilution of the processing solution in the film processor.

Metering pumps 15 may be gang driven by motor 16 through a crankshaft or gear train represented by 20. The metering pumps may be any type of constant displacement pump, e.g., bellows or gear pumps. The motor 16 is controlled by: (a) a first variable signal generator which includes means to generate a first electrical signal (selectable time base generator 18), at least one means to independently vary the first electrical signal (pre-set counter 17 and preferably also linear time base modulator 19), means to apply the first electrical signal to the metering means (control line 23) and means to cumulatively store the first electrical signal (connection 25 and motor 112 of signal accumulator 22), thereby forming an accumulated first electrical signal; (b) a second signal generator (repeat cycle generator 21) to generate a second preset periodic electrical signal; (c) means to compare the second electrical signal with the accumulated first electrical signal (line 24 and signal accumulator 22); and (d) means to apply the difference between said first and second electrical signals to control the metering means (line 26).

Figure 2:
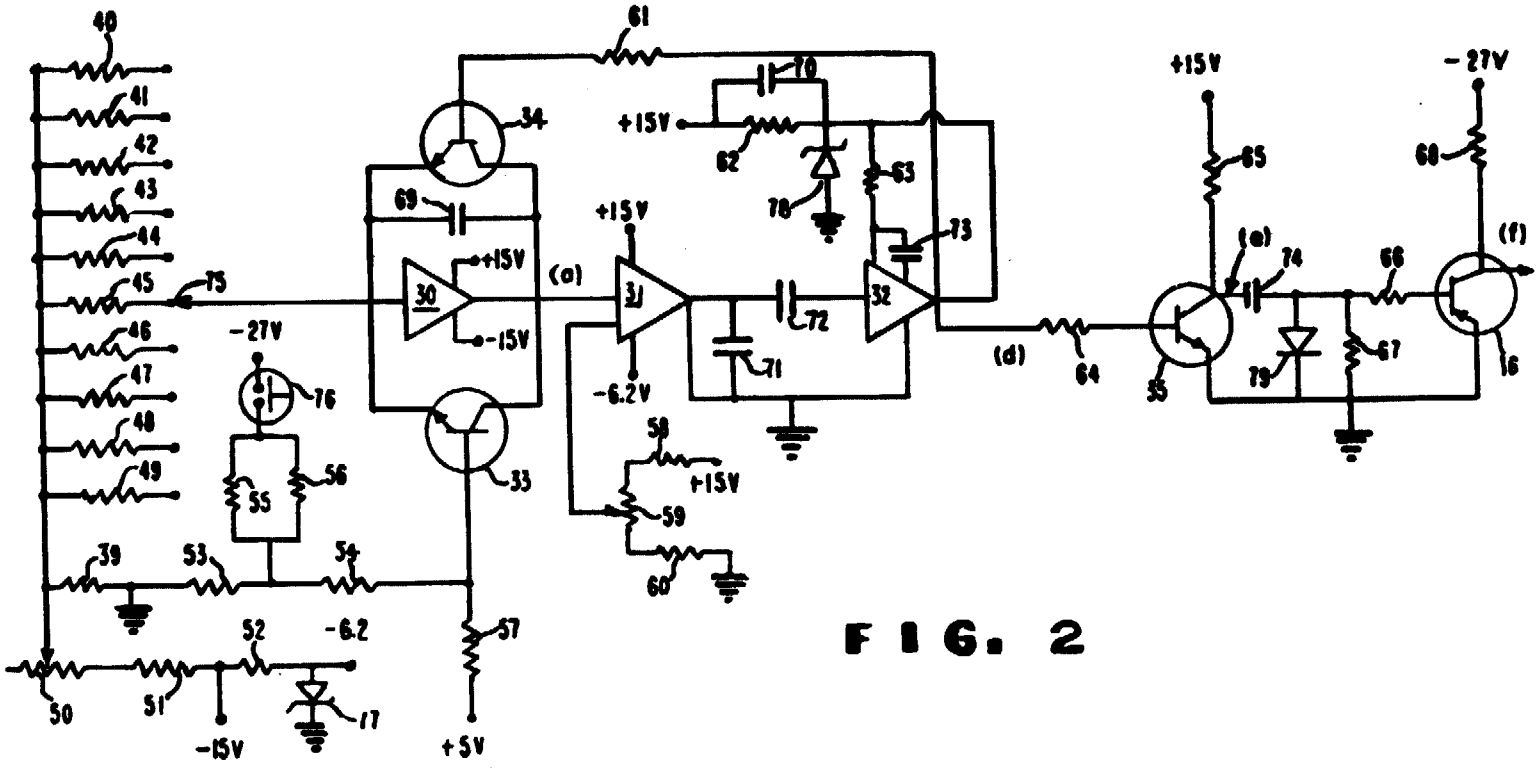
FIG. 2 is a schematic diagram of a selectable time base generator and linear time base modulator of the apparatus embodying the invention.

The motor 16 is, in the first instance, controlled by the pre-set counter 17. Counting pulses are applied to the counter from the selectable time base ramp generator 18, and the time base of this generator may be varied above or below the selected time base by linear time base modulator 19. These three interrelated electronic devices provide a means for using three variables to control the rate at which replenishment solution is added to the processor to replenish that solution depleted by the processed material. Pre-set Counter 17 is a conventional pre-set counter which generates a signal as soon as it receives a first pulse and will continue to generate a signal for a set number of pulses. The number of pulses during which the signal is generated can be varied. If as shown in FIG. 2, a Pre-Set Counter 17 is used to drive motor 16, then by setting the dial on the pre-set counter to a certain value, say 50 for example, the motor will operate to dispense replenishment solution to the processor for the time required for the counter to register 50 pulses. The dial on Pre-Set Counter 17 can be calibrated to read in terms of one variable, i.e., percent exposure, as shown in FIG. 1.

Time Base Generator 18 is designed to generate a saw-tooth pulse of variable frequency. By varying the frequency of the pulse generated by the Time Base Generator 18, the time required to supply a given number of pulses to Pre-Set Counter 17 and hence the length of time during which replenishment solution is added to the processor, can be varied. The means used to vary the frequency of the pulse generated by Time Base Generator 18 can be calibrated to read in terms of a second variable, i.e., film size as shown in FIG. 1.

Finally, Linear Time Base Modulator 19 provides a means for varying the frequency of the pulses supplied to Pre-Set Counter 17 by modifying the signal sent to the Pre-Set Counter 17 by Time Base Generator 18. This means can be calibrated in terms of a third variable, i.e. replenishment rate as shown in FIG. 1.

FIG. 2 shows one embodiment of a Time Base Generator and a Linear Time Base Modulator that can be used in conjunction with a conventional Pre-Set counter to drive motor 16.

The Time Base Generator 18 comprises an amplifier 30, transistors 33 and 34 and associated passive components. Resistors 40 through 49 and capacitor 69 determine the time base by determining how long it takes to charge up capacitor 69. Switch 75 provides for selection of the resistance values from among resistors 40 through 49. The waveform at the output of the Time Base Generator (a) is a saw-tooth wave such as that shown in FIG. 3(a). The time to generate a single tooth is determined by the value of the resistance set by switch 75, corresponding to the film size adjustment discussed relative to FIG. 1 above.

The linear time base modulator comprises differential comparator 31, one shot multivibrator 32 and associated passive components. A zener diode 78 is provided for referencing the voltage applied to the one shot multivibrator. Clamper and pulse amplifier circuits comprising transistors 35, 36 and associated components are provided for driving the counter.

The Linear Time Base Modulator operates by comparing the voltage level of the output signal of the Time Base Generator with a set voltage that can be selected by varying potentiometer 59. When the ramp of the sawtooth wave generated by the Time Base Generator reaches the voltage set by the potentiometer 59, the comparator 31 will generate a signal which will cause multivibrator 32 to generate a pulse, such as that shown in FIG. 3(d). This pulse when applied to transistor 34 will cause it to saturate, shorting out capacitor 69 and hence changing the time base on the saw-tooth wave of FIG. 3(a) to that of FIG. 3(b) or 3(c). The time between the pulses (d) generated by the multivibrator 32, then, will be controlled not only by the time base set by switch 75, but also by the reference voltage set by potentiometer 59 which corresponds to the replenishment rate adjustment described relative to FIG. 1 above.

To convert the pulse (d) generated by the multivibrator to one that can be used by Pre-Set Counter 17, a clipping circuit and amplifier are used. Transistor 35 converts the square wave of FIG. 3(d). The pulse is differentiated by capacitance 74 and resistor 67 to form the pulse shown in FIG. 3(e). Diode 79 then clips the positive part of the waveform. The negative portion of waveform 3(d) is amplified by transistor 36, to form a pulse such as that shown in FIG. 3(f), which is applied to the count input of the pre-set counter. The Pre-Set Counter which is a conventional two decade digital electronic counter, pre-settabe between 0 and 99, which resets to zero at the pre-set count. A suitable relay output is provided for driving motor 16. A −27 volt level output is also provided.

Characteristic values for the components shown in FIG. 2 are given below. Resistors 30–49 can be chosen to give the desired variations. They have values between 40,000 and 600,000 ohms.

TABLE I

| Resistors | | | |
|---|---|---|---|
| FIG. No. | Value (OHMS) | FIG. No. | Value (OHMS) |
| 50 | 10,000 (Pot) | 60 | 3,300 |
| 51 | 5,000 | 61 | 200 |
| 52 | 470 | 62 | 470 |
| 53 | 1,000 | 63 | 12,000 |
| 54 | 4,700 | 64 | 100 |
| 55 | 6,200 | 65 | 1,200 |
| 56 | 4,700 | 66 | 1,000 |

TABLE I-continued

| | | | |
|---|---|---|---|
| 57 | 4,700 | 67 | 9,100 |
| 58 | 13,000 | 68 | 47,000 |
| 59 | 5,000 | 39 | 330 |
| | 18(Pot) | | |

| CAPACITORS | | | |
|---|---|---|---|
| FIG. No. | Value (Microfarads) | FIG. No. | Value (Microfarads) |
| 69 | 0.47 | 72 | 0.22 |
| 70 | 0.47 | 73 | 0.01 |
| 71 | 0.10 | 74 | 0.01 |

| TRANSISTORS | | | |
|---|---|---|---|
| FIG. No. | Designation | FIG. No. | Designation |
| 30 | UGA 7101 | 35 | 2N4123 |
| 31 | UGA 710 | 36 | 2N4125 |
| 32 | UGA 9951 | 77 | 1N4735 |
| 33 | 2N4123 | 78 | 1N4733 |
| 34 | 2N4123 | 79 | |

Figure 3:
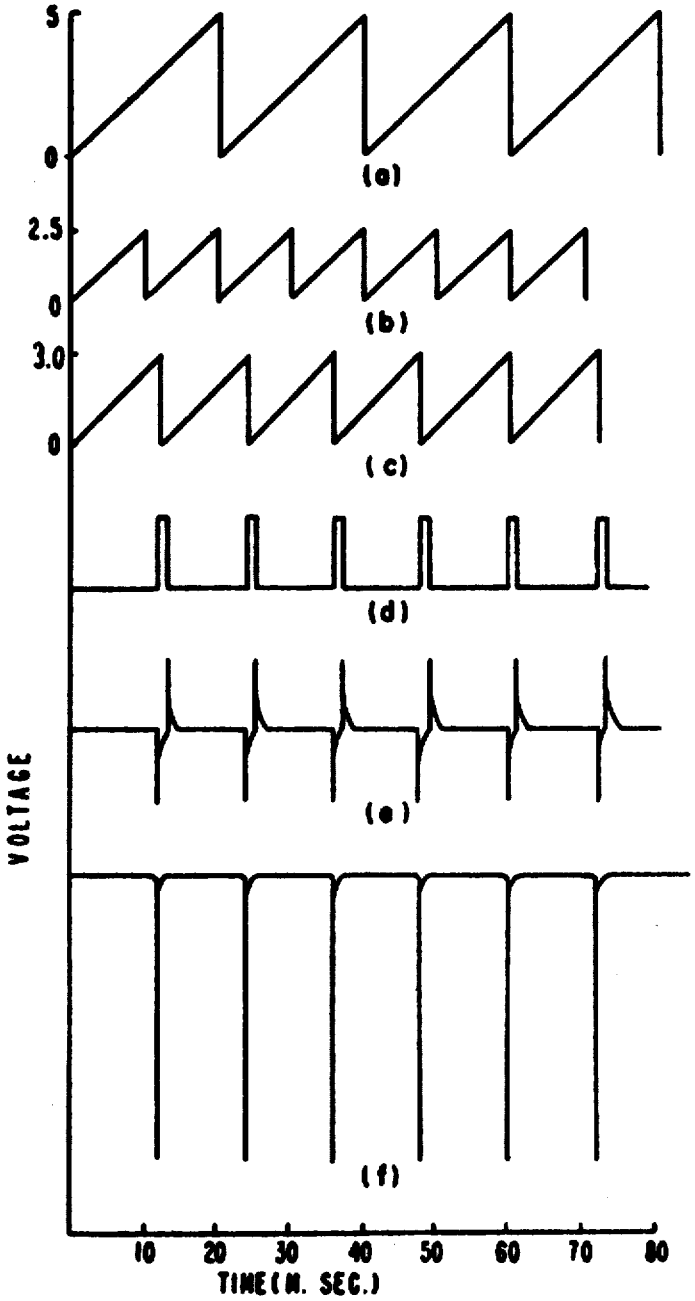
FIG. 3 is a timing diagram representing the operation of the time base ramp generator and linear time base modulator.

The operation of the control means which replenishes solution used by the processed material will now be described in more detail with reference to FIG. 2 and FIG. 3.

The size of the film sheet is ascertained and switch 75 is set to the resistor corresponding with the base time, e.g., 20 msec as shown in FIG. 3(a). The operation of the linear time base modulator can be understood readily by assuming the differential comparator level is set for its mid-point and calibrated to apply 2.5 volts to the reference input. The ramp signal from the time base ramp generator is applied to the comparator input, and when the ramp level reaches 2.5 volts differential comparator 31 produces an output signal. This signal is applied to the one shot multivibrator 32. The one-shot multivibrator produces a uniform pulse having a narrow pulse width, e.g., less than or equal 1 msec. This pulse is applied to the base of transistor 34 through resistor 61. Transistor 34 is saturated and capacitor 69 discharges through this transistor cutting off the ramp at T=10 msec. The transistor 34 is returned to cut off, after the short duration pulse, and capacitor 69 charges again, until the ramp function again reaches the 2.5 volts comparator level. Then another pulse is produced by the one shot multivibrator saturating transistor 34 and discharging capacitor 69. It can be seen readily that the time period T can be varied above and below 10 msec by adjusting the comparator level potentiometer above or below the mid-point level, e.g., by setting the comparator level potentiometer for a 3 volt reference input to the differential comparator the time period is changed from 10 msec. to 12 msec, FIG. 3(c).

A pulse output from the one shot multivibrator 32 is applied to the clipping and pulse amplifier circuit and the output of the pulse amplifier is applied to the counter 17. The counter 17 corresponds with percent exposure between 1–100 percent. At the pre-set count the output relay of the counter drops out, and the pump motor is dropped out cutting off the flow of solutions to the processor. The −27 volt level output from the counter is applied through latched start button 76 to the base of transistor 33, saturating the transistor. Capacitor 69 is kept discharged and the time base ramp generator is disabled until start button 76 is pressed. The motor 61 is also controlled by the signal accumulator 22. When the processor demands replenishment, the pumping time is recorded in the signal accumulator and storage 22. When the repeat cycle generator (21) calls for replenishment to compensate for aerial oxidation, the signal generated is applied to the signal accumulator 22 and the three way valve 14. The three way valve 14 selects a solution concentrate that may be of different formulation than the replenisher solution used to compensate for developer exhaustion due to film processing as compared to developer aging. The output of accumulator 22 is a controlling signal which lasts a time equal to a pre-set time interval as determined by the repeat cycle generator, reduced by a time interval corresponding to the total time of operation of motor 16 since the last operation of the repeat cycle generator 21. At the end of the operation of the repeat cycle generator 21, a reset pulse is applied to the signal accumulator and storage 22 to reset the system to the original state.

Figure 4:
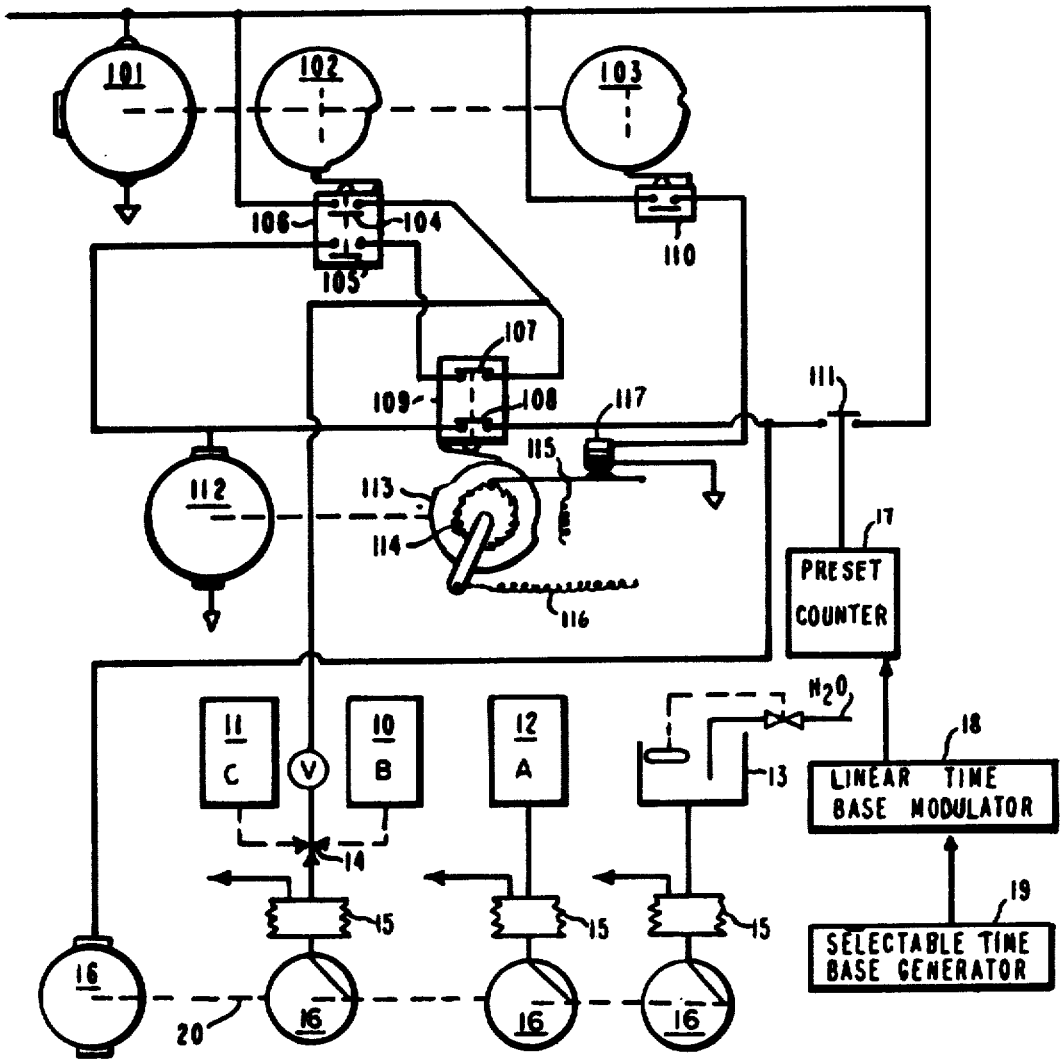
FIG. 4 is a schematic diagram of an embodiment of the equalizer circuit.

The operation of the equalizer circuit can best be understood by reference to FIG. 4. The combination timing motor 101, cam 102, switch 109, switch 106, timing motor 112 and cam 113 constitute the repeat cycle second electrical signal generator.

Timing motor 101 is selected to have a convenient timing period, such as 2 hours. Other cycling periods can be chosen without upsetting the equalizer principle. When cam 102 de-energizes switch 106, contacts 104 close and power is applied to contacts 107 of switch 109. Depending on the position of cam 113, contacts 107 will be either open or closed. Cam 113 is driven by motor 112. If motor 112 has not operated since the last time cam 113 was reset, as explained below, contacts 107 will be closed and power will be applied through contacts 105 of switch 106 operated by cam 102, to motor 112. Operation of motor 112 will turn cam 113 until switch 109 is actuated, opening contacts 107 and interrupting power to motor 112.

Motor 16 which drives the metering pump 15, 15', 15'', etc. is connected in parallel with timing motor 112. The output side of contacts 104 is also connected to the operator of the three way valve 14. Therefore, when timing motor 101 through cam 102 closes contacts 104, the three way valve 14 is energized, connecting metering pump 15 to reservoir 11 containing the desired solution concentrate. Simultaneously pump motor 16 will operate metering pumps 15, 15' and 15'' supplying the right amount of solution concentrates to the processor. The motor 16 will operate so long as contacts 104, 105, 107, and 108 are closed. Cam 113 is so set as to open contacts 107 before cam 102 opens contacts 104 and 105; this allows the flow through pump 15 to stop before reservoir 11 is disconnected and reservoir 10 introduced in the hydraulic circuit. The operation of motor 101 through cam 103 actuates switch 110 to energize the clutch coil 117. Cam 113 is frictionally driven by motor 112 and spring loaded through spring 116. A ratchet 114 and pawl 115 arrangement allows cam 113 to rotate in one direction and is prevented from resetting through the action of pawl 115. Pawl 115 is electromagnetically lifted to disengage ratchet 114 and reset cam 113 by energizing coil 117. Motor 112 can also be operated through contacts 111, which are closed whenever the preset counter energizes motor 16 in response to a demand for replenishment solution. When contacts 111 are closed, motor 112 rotates cam 113. The ratched-pawl arrangement holds cam 113 in position after contacts 111 open.

Thus cam 113 becomes the storage and accumulator of the total time motor 16 has operated which is a measure of how much replenishment solution has been added to the machine since the last reset command. The electrical signal through contacts 108 resulting in the absence of any advance of cam 113 from the reset position corresponds to the second electrical signal. The advancement of cam 113 corresponds to the accumulated first electrical signal. The remaining travel of cam 113 corresponds to the difference of the two electrical signals, and the output is applied through contacts 108 to the pump motor 16. Typical cycling times may be:

| | |
|---|---|
| Timing motor 101 2 hours | |
| Cam 102: Active time: | 120 sec. |
| Inactive time: | 7080 sec. |
| Timimg motor 112 period: | 300 sec. |
| Cam 113:Max. Active time: | 180 sec. |
| Min. Inactive time: | 120 sec. |

The replenishment apparatus of this invention provides substantially uniform addition over a wide range of film sizes, replenishment rates and percent exposures. By way of example the apparatus of the invention may be used with automatic lithographic film processors for film sizes from 8 inches × 10 inches up to 24 inches × 36 inches demanding from 5 cc to 850 cc of replenishment solution, respectively. At a pump volume of 3,000 cc per minute the apparatus will provide substantially uniform and accurate replenishment over the given replenishment range limited only by the accuracy and repeatability of the mechanical components.

The volume of replenishment solution added can also be controlled by the voltage applied to resistors 40–49 through potentiometer 50. For example, changing the input voltage to 10 volts will shift the selectable time base by T/2 and changing the input voltage will shift the selectable time base by T/3.

Bulk replenishment may be provided for direct control of the pump motor and metering means if desired, for example, for roll film processing. Additional elements may be incorporated, such as alarms to inform the operator when the containers of the replenishment solutions are empty; switching arrangements that allow the operator to override some or all of the functions of the electronic controls; alarm circuits to automatically turn the equipment off in case of control failure.

The above description of the apparatus is merely illustrative and not limiting. Electronic components can replace the electromechanical parts used in the equalizer and the pre-set counter, linear time base modulator and selectable time base generator can be replaced by more conventional R-C type networks without altering the scope of the invention. Use of the apparatus for control of the addition of replenishment solutions other than developer solutions is contemplated.

While the apparatus and its use have been described specifically with respect to the preparation and replenishment of developer combinations, it is obvious that the principles and equipment may be applied to the makeup and periodic replenishment of other photographic processing solutions. For example, various operations in the preparation and use of solutions such as; fixer, bleach solutions, hardeners, short stops, reducers, intensifiers, and combination solutions such as, monobaths (developer/fixer), fogging developers, and bleach/fixer combinations may be prepared and replenished by appropriate adjustment of the contents of the reservoirs.

What is claimed is:

1. An apparatus for controlling replenishment solution to a photographic processor comprising:

1. at least one reservoir for solution concentrates,
2. at least one metering means associated with said reservoir for transferring a portion of said solution concentrate from said reservoir to said processor, and
3. means for controlling said metering means comprising:
   a. a first variable signal generator including: means to generate a first variable electrical signal; at least one means to independently vary said first electrical signal; means to apply said first electrical signal to control said metering means, and means to cumulatively store said first electrical signal, thereby forming an accumulated first electrical signal;
   b. a second signal generator to periodically generate a second, preset, electrical signal;
   c. means to compare said second electrical signal with the accumulated first electrical signal, and
   d. means to apply the output of said means to compare said second and accumulated first electrical signals to control said metering means.

2. The apparatus of claim 1 comprising at least two reservoirs and at least two metering means.

3. The apparatus of claim 1 comprising at least three reservoirs and at least three metering means.

4. The apparatus of claim 3 wherein said first variable signal generator comprises a pre-set counter for activating said metering means, said pre-set counter having means for selecting the set number of received pulses during which it will activate said metering means, and a time base generator, connected to said pre-set counter, for generating a periodic signal, said time base generator having means for varying the period of the signal it generates.

5. The apparatus of claim 4 wherein the difference of said second and accumulated first electrical signal is applied to select which of two solution reservoirs is connected to one of said metering means.

6. The apparatus of claim 1 wherein said first variable signal generator comprises a pre-set counter for activating said metering means, said pre-set counter having means for selecting the set number of received pulses during which it will activate said metering means, a time base generator for generating a periodic signal, said time base generator having means for varying the period of the signal it generates, and a time base modulator, connected between said pre-set counter and said base generator, for modulating the period of the signal generated by said time base generator and generating a pulsed signal, having a frequency equivalent to the modulated signal, said time base modulator having means for varying the modulation applied to the signal generated by said time base generator.

7. The apparatus of claim 6 wherein the difference of said second and accumulated first electrical signal is applied to select which of two solution reservoirs is connected to one of said metering means.

8. The apparatus of claim 6 wherein said time based modulator is a linear time base modulator comprises a voltage comparator, having a reference input voltage to compare with the output of said time base ramp generator, which will generate a signal when the output voltage of the time base ramp generator is greater than the reference input voltage, and a multivibrator to convert the signal generated by said voltage comparator to a square wave pulse.

9. The apparatus of claim 6 wherein there are at least four reservoirs including a water reservoir, connected to a first metering means, a first reservoir for solution concentrates, connected to a second metering means, said second and third reservoirs being connected to a single metering means through a three-way valve so that either said second or said third reservoir can be connected to said third metering means.

10. The apparatus of claim 6 wherein said second signal generator comprises a repeat cycle timer and a switch combination to generate an adjustable duration electrical pulse.

11. The apparatus of claim 10 wherein said means to cumulatively store the first electrical signal comprises a resettable switching timer.

12. The apparatus of claim 11 further comprising means to operate said resettable switching timer include means to operate said resettable switching timer for a preset time, said resettable switching timer being connected to both said second signal generator and said preset counter so that said resettable switching timer will operate for a length of time equal to the preset time minus the time that it has operated due to the first electrical signal and will generate an electrical signal corresponding to the difference between the duration of the second electrical signal and the accumulated first electrical signal.

13. An apparatus for controlling replenishment solution to a photographic processor comprising, in combination a. at least one reservoir for solution concentrates;
b. at least one metering means associated with said reservoir for transferring a portion of solution concentrate from said reservoir to said processor; and
c. means for controlling said metering means comprising a pre-set counter for activating said metering means, said pre-set counter having means for selecting the set number of received pulses during which it will activate said metering means, a time base generator for generating a periodic signal, said time base generator having means for varying the period of the signal it generates, and a time base modulator, connected between said pre-set counter and said time base generator, for modulating the period of the signal generated by said time base generator and generating a pulsed signal having a frequency equivalent to the modulated signal, said time base modulator having means for varying the modulation applied to the signal generated by said time base generator.

14. The apparatus of claim 13 wherein said linear time based modulator is a time base modulator comprises a voltage comparator, having a reference input voltage to compare with the output of said time base ramp generator, which will generate a signal when the output voltage of the time base ramp generator is greater than the reference input voltage, and a multivibrator to convert the signal generated by said voltage comparator to a square wave pulse.

*15. In apparatus for controlling the addition of replenishment solution to a processing solution in a photographic film processor having at least one reservoir for replenishment solution, metering means associated with said reservoir for selectively transferring said replenishment solution from said reservoir to said processor, and adjustable control means associated with said metering means for controlling*

*the transfer of said replenishment solution, the improvement comprising:*

*an adjustable signal means for generating a signal representative of the utilization of said processing solution by said processor on the basis of film processed,*

*a preset signal means for generating a signal representative of said processing solution's degradation due to aging, and*

*comparator means responsive to said two signals for providing a replenishment control signal related to both film use and aging degradation of said processing solution to said adjustable control means for controlling said metering means.*

*16. The apparatus set forth in claim 15 wherein said comparator means compensates for processing solution added to said processor in response to film processed.*

* * * * *